United States Patent
Wu et al.

(10) Patent No.: US 9,893,952 B2
(45) Date of Patent: Feb. 13, 2018

(54) DYNAMIC TELEMETRY MESSAGE PROFILING AND ADJUSTMENT

(71) Applicant: Microsoft Technology Licensing, LLC, Redmond, WA (US)

(72) Inventors: Yi-Lei Wu, Redmond, WA (US); Eric M. Borzello, Redmond, WA (US); Peter A. Gurevich, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 510 days.

(21) Appl. No.: 14/593,869

(22) Filed: Jan. 9, 2015

(65) Prior Publication Data

US 2016/0204992 A1    Jul. 14, 2016

(51) Int. Cl.
*H04L 12/24* (2006.01)
*H04L 12/26* (2006.01)
(Continued)

(52) U.S. Cl.
CPC .......... *H04L 41/14* (2013.01); *G06F 11/0766* (2013.01); *G06F 11/3006* (2013.01); *G06F 11/3072* (2013.01); *H04L 41/0893* (2013.01); *H04L 43/00* (2013.01); *H04L 43/04* (2013.01); *G06F 11/3003* (2013.01); *G06F 11/3013* (2013.01); *G06F 11/3082* (2013.01); *G06F 2201/865* (2013.01)

(58) Field of Classification Search
CPC ............. G06F 11/0766; G06F 11/3003; G06F 11/3006; G06F 11/3013; G06F 11/3072; G06F 11/3082; G06F 2201/865; H04L 41/0893; H04L 41/14; H04L 43/00; H04L 43/04

USPC ......................................................... 709/224
See application file for complete search history.

(56) References Cited

U.S. PATENT DOCUMENTS 7,577,542 B2    8/2009  Vacar et al.
7,970,890 B1 *  6/2011  Krivopaltsev ...... H04L 41/5035
                                                    370/241
(Continued)

FOREIGN PATENT DOCUMENTS

WO           03019377 A2    3/2003

OTHER PUBLICATIONS

"International Search Report and Written Opinion Issued in PCT Application No. PCT/US2016/012250", dated May 12, 2016, 15 Pages.

(Continued)

*Primary Examiner* — Alina N Boutah
(74) *Attorney, Agent, or Firm* — Talem IP Law, LLP

(57) ABSTRACT

Techniques and systems are described to improve computing device telemetry collection by automatic analysis and dynamic adjustment of telemetry collection rules. Certain implementations use a telemetry service to analyze telemetry messages and direct the adjusted rules at the client computing device, automatically and gradually refining telemetry collection as more relevant telemetry is received. Dynamic adjustments that can be made to the collection rules include, for example, changes to the collection frequency of telemetry messages, changes to the level of detail transmitted in the telemetry messages, and changes to the targets (e.g., applications, components, devices) from which to collect.

19 Claims, 4 Drawing Sheets

(51) Int. Cl.
*G06F 11/07* (2006.01)
*G06F 11/30* (2006.01)

(56) References Cited

U.S. PATENT DOCUMENTS

| | | | |
|---|---|---|---|
| 7,990,860 B2* | 8/2011 | Smith | H04L 47/10 370/230.1 |
| 8,375,120 B2* | 2/2013 | Rand | H04L 29/12066 709/224 |
| 8,543,866 B2 | 9/2013 | Beverly | |
| 8,595,379 B1* | 11/2013 | Brandwine | G06F 1/3203 709/224 |
| 8,660,952 B1 | 2/2014 | Viera et al. | |
| 8,935,380 B2* | 1/2015 | Arnott | G06F 21/577 370/230 |
| 9,521,052 B1* | 12/2016 | Nandyalam | H04L 43/08 |
| 2005/0243972 A1* | 11/2005 | McKinnel | H04L 43/00 379/32.01 |
| 2006/0007870 A1 | 1/2006 | Roskowski et al. | |
| 2006/0112061 A1* | 5/2006 | Masurkar | G06F 11/0709 706/47 |
| 2006/0206698 A1* | 9/2006 | Foucher | G06F 21/577 713/1 |
| 2007/0291647 A1* | 12/2007 | Smith | H04L 49/90 370/237 |
| 2010/0087188 A1 | 4/2010 | Griff et al. | |
| 2010/0241903 A1* | 9/2010 | Goldszmidt | G06F 11/0709 714/38.14 |
| 2011/0176449 A1* | 7/2011 | Robbins | H04L 65/1076 370/252 |
| 2011/0320586 A1 | 12/2011 | Maltz et al. | |
| 2012/0144246 A1* | 6/2012 | Dreyfoos | G06F 11/302 714/47.1 |
| 2012/0215492 A1* | 8/2012 | Masurkar | G06F 11/0709 702/185 |
| 2013/0268491 A1* | 10/2013 | Chung | G06F 17/30174 707/634 |
| 2014/0089354 A1 | 3/2014 | Gonsalves et al. | |
| 2014/0280878 A1* | 9/2014 | Hardin | H04L 41/145 709/224 |
| 2015/0046512 A1* | 2/2015 | Ashby | H04Q 9/00 709/203 |
| 2015/0081790 A1* | 3/2015 | Ogawa | G06F 17/30595 709/204 |
| 2017/0111835 A1* | 4/2017 | Chandrasekaran | H04L 65/1069 |

OTHER PUBLICATIONS

"International Preliminary Report on Patentability Issued in PCT Application No. PCT/US2016/012250", dated Mar. 3, 2017, 11 Pages.

"Second Written Opinion Issued in PCT Application No. PCT/US2016/012250", dated Dec. 5, 2016, 10 Pages.

"Instrumentation and Telemetry Guidance", Retrieved on: Jun. 3, 2014 Available at: http://msdn.microsoft.com/en-us/library/dn589775.aspx.

Bailey, Shawn, "Overview of SOA Diagnostics in 11.1.1.6", Published on: Jun. 12, 2012 Available at: https://blogs.oracle.com/soaproactive/entry/overview_of soa_diagnostics_in#SelectiveTracing.

U.S. Appl. No. 13/961,641, Ashby, et al., "Dynamic Collection Analysis and Reporting of Telemetry Data", filed Aug. 13, 2013.

* cited by examiner

DYNAMIC TELEMETRY MESSAGE PROFILING AND ADJUSTMENT

BACKGROUND

Telemetry is the process by which data is collected at remote components and transmitted to receiving components for monitoring. Today's computing environment includes a wide diversity of computing devices such as smartphones, tablets, laptops, and wearables. Telemetry data is frequently needed from these devices, for example to diagnose errors or problems in the software or hardware, or to collect information about usage patterns. However, collecting telemetry data from these devices remotely is often limited by such factors as their processing power, battery, network connectivity, bandwidth, and/or data plan.

BRIEF SUMMARY

Techniques and systems are described to improve computing device telemetry collection by enabling telemetry messages to be automatically analyzed so that telemetry collection rules can be dynamically adjusted.

Telemetry messages can include error logs, error information from debuggers, usage data, and performance data. Telemetry collection rules inform a client device or application how often and what types of telemetry messages to collect. Dynamic adjustments that can be made to the collection rules include, for example, changes to the collection frequency of telemetry messages, changes to the level of detail transmitted in the telemetry messages, and changes to the targets (e.g., applications, components, devices) from which to collect. Certain implementations use a telemetry service, which may be remotely hosted from the client computing device, to analyze telemetry messages and direct the adjusted rules at the client computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
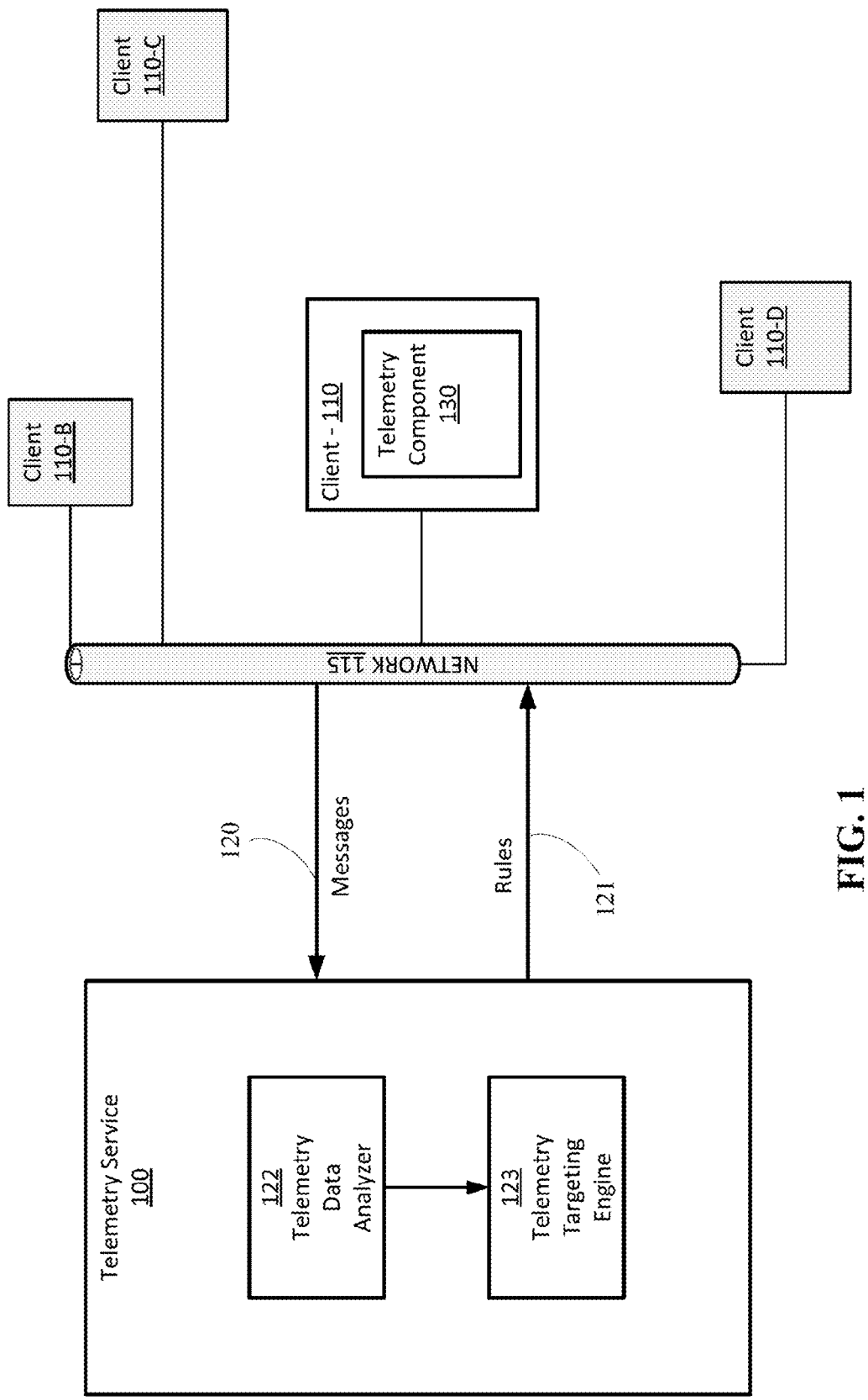
FIG. 1 shows an example component environment for dynamic telemetry message profiling and adjustment.

Techniques and systems are described to improve computing device telemetry collection by enabling telemetry messages to be automatically analyzed so that telemetry collection rules can be dynamically adjusted. Telemetry messages can include error logs, error information from debuggers, usage data, and performance data. Telemetry collection rules inform a client device or application how often and what types of telemetry messages to collect.

Certain implementations use a telemetry service, which may be remotely hosted from the client computing device, to analyze telemetry messages and direct the adjusted rules at the client computing device. Dynamic adjustments that can be made to the collection rules include, for example, changes to the collection frequency of telemetry messages, changes to the level of detail transmitted in the telemetry messages, and changes to the targets (e.g., applications, components, devices) from which to collect telemetry.

A simple example involving an application error on a smartphone may illustrate certain advantages of the described techniques and systems. Here, in response to a user's action, the application logs a single error message that contains the application-generated error code. The error message is collected by a telemetry service, which automatically analyzes the error message by the type of application and the error code. The telemetry service determines from the analysis that additional data may be needed in order to debug and correct the error.

The telemetry service sends an updated telemetry collection rule to the smartphone, directing it to enable more detailed logging of the application's events over a period of a few minutes. The smartphone, as requested, enacts the new rule, gathers the detailed logs, and sends the messages containing the new information to the telemetry service. Based on the new information from these more detailed logs, the telemetry service repeats the analysis process, perhaps sending another new rule to request even more detailed logging, a longer collection period, or a different type of logging or logging on a different component.

Technical features of the described techniques and systems can enhance the functioning both of the client computing device and the overall operating environment in several ways. Many devices have limited network bandwidth for various reasons, e.g., the device is connected to a slow or degraded network, the device is subject to data caps or throttling imposed by a mobile network carrier, or the user has self-imposed bandwidth limitations for cost-saving. Telemetry messages that are frequent or heavy in content (e.g., containing detailed operations logs or extensive state data) can impact both a device and the network devices with which the device interoperates. Heavy or frequent telemetry messages can impact other devices on a limited network by clogging the network with data that is unrelated to application content. On a device with limited bandwidth, other primary network functions on the device, such as retrieving actual application content from remote services, may be negatively impacted when the device is busy sending telemetry messages instead.

Furthermore, heavy telemetry collection can have a processing system impact. Sometimes, a substantial number of processing system cycles are used to collect, parse, and assemble telemetry messages. On a device with limited processing power, the impact can be proportionally more noticeable. In fact, the impact is significant enough that the amount of diagnostic logging versus the speed of an application or component is a frequent design tradeoff in software and systems architecture.

The described techniques and systems can improve network performance and processing system performance by dynamically and automatically adjusting a device's collection rules to modify, e.g., the quantity and frequency of collection, as well as to specifically target what was gathered. Either or both of these features enabling "just-in-time telemetry" results in a device or network that functions more optimally.

Initially, a device can be configured to collect a minimal amount of telemetry data so that telemetry messages are small and/or infrequent. When a problem is indicated, the amount of telemetry data can be increased. On a device with limited processing power, this can mean more efficient operation of the device, as fewer processing system cycles are used to collect, parse, and assemble the telemetry messages during times when the device is functioning smoothly. Furthermore, specifically targeting the telemetry collection to relevant (e.g., faulty) components ensures that predominantly the most important telemetry data is being gathered, and that the network and processing system are not being unduly burdened by extraneous requests.

Moreover, using described systems and techniques, a tradeoff between quantity/quality of telemetry collection and the performance impact no longer has to be considered at the system coding phase, but can be dynamically and automatically adjusted to match the level needed at the time needed. The effect on the functioning of the client device is that the client device performs at maximum processing and network efficiency, until such time as more processor or network resources are needed for a specific information-gathering scenario.

Better targeting of telemetry data collection may also result in a more reliable device or an application with enhanced reliability. For instance, automated telemetry message processing may detect error conditions prior to the user experiencing negative impacts. Using disclosed techniques and systems, analysis of the error conditions and escalation or modification of telemetry collection occurs in an automated fashion. This rapid instrumentation may result in problem diagnosis or system correction with reduced device or application downtime; in some cases, remedial action may even be taken automatically before an end-user even realizes a problem existed.

FIG. 1 shows an example component environment for dynamic telemetry message profiling and adjustment. In FIG. 1, telemetry service 100 implements certain techniques for analyzing telemetry data and creating rule adjustments as described with respect to the process flows in FIGS. 2A-2C. Telemetry service 100 communicates with a client device 110 over network 115 to receive telemetry messages 120 and communicate telemetry rules 121 to the client (e.g., client device 110). Other instances of client devices 110-B, 110-C, and 110-D are shown to illustrate that a telemetry service 100 can receive messages from multiple clients, analyze messages 120 from multiple clients when conducting data analysis, and communicate rule modifications 121 to multiple clients.

In certain implementations, telemetry service 100 can include one or more sub-components, such as a telemetry data analyzer 122, for carrying out telemetry data analysis on the data contained in one or more telemetry messages. A telemetry data analyzer 122 conducts analysis on telemetry messages 120. Telemetry service 100 can also include a telemetry targeting engine 123, which identifies rule modifications 121 from the analysis performed by the data analyzer 122 and sends the rule modifications 121 to one or more clients 110. Aspects of the processes performed by the telemetry data analyzer 122 and telemetry targeting engine 123 are discussed more fully with respect to the example process flows in FIGS. 2A-2C.

A "telemetry message" is a signal from a client containing one or more kinds of telemetry data. Telemetry messages can include error logs, error information from debuggers, usage data logs, and performance data. A telemetry message contains an indicator of the source of the telemetry, identifying, for example, the device, user, application, component, license code, subdivision or category within an application or component, or other information that is the origin of the telemetry message. Knowledge of the source of a telemetry message allows rule adjustments to be directed back at the original source, or to be directed at other targets with the same or similar source identifiers.

In some cases a source identifier will be constituted of one or more individual identifiers that are combined to identify the source with great accuracy, for instance, device, application, component, and category. For example, a device identifier may uniquely identify a specific device on which an error occurs. An application identifier describes the application that generated the error, a component identifier the particular module within the application, and a category identifier the specific feature within the component. A single identifier or combination of identifiers may be referred to herein as a telemetry message "source identifier." The identifiers that compose a source identifier may be called "individual identifiers."

A telemetry message also contains "state information," or information about the conditions or circumstances surrounding, e.g., the error or usage data. The state information can vary widely by the type of telemetry message and the system, and holds information ranging from a simple numeric code to a detailed log of activities or events occurring at a point in time or over a time period. Some example types of telemetry message state include log data, event data, performance data, usage data, crash reports, bug reports, stack traces, register states, heap states, processor identifiers, thread identifiers, and application or component-level try/catch block exceptions. Telemetry message state can also include real-time performance information such as network load or processor load. It should be noted that these types of telemetry message state are merely exemplary and that any type of information that could be gathered from a device can potentially be contained in the telemetry message state, depending on the logging or telemetry capabilities of the device, application, or components. Naturally, a particular telemetry message's state information can include more than one type of state information.

In many cases a code or description, for example an error code or description, is included in the telemetry message that identifies the problem, event, or operation with a high degree of granularity. Sometimes, an error code or description is identified by the operating system, and sometimes an error code or description is specific to a particular application or component; in the latter case, a source identifier specifying the component may be required to discern the error condition.

The telemetry message state can also contain information about other components or applications on the device, even when the information is not generated by or gathered from the source that spawned the message. For example, sometimes multiple applications on a device can combine to interact negatively and cause errors; thus, if one application experiences an error, it may be useful to know all of the other applications that are installed on the device.

Other information can also be contained in a telemetry message. For example, the very detailed log of an application that communicates with a relational database might contain the text of the Structured Query Language (SQL) commands used to update or retrieve a specific piece of data at a particular time. The telemetry message may contain part of this log, which can be used to diagnose problems when certain kinds of data are being inconsistently updated in the database.

A telemetry message can also contain usage data about applications or components on the device. Such usage data might be useful to product designers for refining features or user interfaces. For example, a telemetry message with usage data can have a detailed log of the user's movements in an application's user interface over the period of time when the user is using a particular feature. The usage data might contain information like mouse movements or menu/button clicks that could be analyzed later by a product designer to determine if a feature can be made easier to use.

In certain embodiments, a telemetry component 130 is present on client 110 that facilitates the transfer of rules and messages between the client 110 and the telemetry service 100. It should be noted that a telemetry component may be provided by one or more free or commercial sources, such as for example the operating system provider for a particular kind of client device 110. The telemetry service may be capable of interpreting telemetry messages from, and sending rule adjustments to, a telemetry component using an application programming interface. The telemetry service may interchange messages and rules with a number of different telemetry component providers.

Telemetry component 130 on client 110 may include sub-components or interact with other modules to perform various processing functions. For instance, a component functioning as a rule manager/analyzer may receive rules, rule modifications, and rule adjustments from the telemetry service and enable the rules in the environment of the particular device by translating a particular rule or rule adjustment, which may be written in a generalized description language, into actions on the device.

In certain embodiments, raw telemetry data is processed into telemetry messages 120 by the telemetry component 130 on the client device 110 before being sent to the telemetry service 100. For example, a data logger may tap into the instrumentation or logging capabilities of specific applications, components, or an operating system to obtain raw telemetry data. A dynamic data collector can collect specific real-time information such as processor states and memory states, from device components. Real-time and logged information may need to be assembled or condensed to be sent over the network.

A component functioning as a telemetry transport can, for example, parse, assemble, repackage, enhance, and/or condense the raw telemetry data into a form that is more digestible to the telemetry service. The telemetry transport may assemble raw data together or eliminate unnecessary data in order to reduce network bandwidth before sending telemetry messages to the telemetry service at specified times.

When the telemetry service 100 has analyzed the contents of one or more telemetry messages, the telemetry service 100 may generate "telemetry rules" or "rule adjustments" (i.e., rules that modify existing telemetry rules) 121. A telemetry rule 121 describes the parameters for telemetry collection on the client.

A telemetry rule 121 can direct the client to modify how it collects telemetry data in several ways. For example, a telemetry rule 121 can tell the client to change the collection frequency of telemetry messages; the level of detail ("verbosity") transmitted in the telemetry messages, including whether to enable or disable telemetry collection altogether; the time to initiate or end telemetry data collection; the duration of telemetry data collection; and the targets (e.g., applications, components, devices) from which to collect.

A rule adjustment occurs when a prior or default rule already present on a device is modified or transformed by a subsequent instruction from the telemetry service. In practice a rule adjustment is similar to a new rule that replaces the old rule. For example, a client device may have certain default rules that do minimal telemetry data collection during routine operations. The telemetry service 100 may send a rule adjustment to enable more detailed telemetry data collection after a problem arises. In this case, a "rule adjustment" is essentially a new rule that replaces the prior default rule.

In certain cases, the telemetry service 100 issues multiple rules in response to a given telemetry message. The multiple rules can modify, for example, more than one aspect of telemetry data collection and/or more than one target. For instance, two rules might be issued in response to a given message from an application, the first of which directs the client telemetry component 130 to intensively log the application's telemetry for a specific usage period (e.g., five minutes). The second rule directs the client telemetry component 130 to log information from a shared software layer (e.g., a shared data access component) that the application depends upon.

Furthermore, depending on the implementation, rules can be relatively elemental and be assembled together to form more complex instruction sets. Constructions or assemblies of these elemental rules can be generated by the telemetry service 100 which, in some cases, can be enacted serially or in parallel on the client by the telemetry component 130. For example, one rule may instruct the telemetry component 130 on the client to "enable logging in component X;" a second may instruct the client to "collect telemetry data on category A feature areas from component X;" a third elemental rule may instruct the client "to consolidate all telemetry data generated for a five minute period from category A, component X into a single telemetry message."

A rule may target a component that is seemingly unconnected to the source of the original telemetry message. For example, receipt of a telemetry message with a particular kind of application error may indicate to the telemetry data analyzer 122 that a hardware component, such as a storage device or disk, is failing. In response, the telemetry targeting engine 123 can issue a rule 121 that increases the diagnostic logging on client device storage components in order to determine if errors are present, even though storage components were not the source of the telemetry message with the error.

Sometimes, the multiple rules may target more than one client device. The rules may be different rules, or multiple copies of the same rule language directed at several client devices matching a type. For instance, analysis of telemetry messages may conclude that telemetry data collection changes on a component installed on numerous clients are desirable, e.g., all the client devices running a particular version of an application. Instead of directing the rule modification to collect telemetry data from the component only on the device experiencing a problem, the telemetry service 100 can direct the rule adjustment 121 to multiple client devices running the component, as information from additional clients may be helpful in diagnosing the problem.

In some implementations, a rule or rule adjustment 121 includes an instruction to enact a reparative action on one or more client components. The reparative action can be in the form of an instruction to download a patch or software update. For example, perhaps a certain combination of software components on the device causes a problem that is indicated by a telemetry message 120 with a particular error code. One of the software component vendors has a patch to their software that ameliorates the problem. The telemetry service 100, in response to receiving a telemetry message 120 with the error code, can issue a rule 121 containing an instruction to download the software component vendor's patch and apply it. Depending on the implementation of telemetry rule processing on the client, a telemetry component may enact a reparative rule by directing other components (e.g., a software update component) on the client to download and update the indicated software patch.

A telemetry rule can be described in a variety of ways. One common way is using a standardized scripting language, such as JavaScript or Perl. Another way is to use Extended Markup Language (XML) to describe the data structure of a rule with a nested series of elements and properties/attributes. The telemetry service 100 sometimes sends a modified rule to replace an existing rule already present on the client device 110. Sometimes, predominantly the modified portions of an existing rule are sent to the client device 110. Rule adjustments 121 that instruct the client device to disable and enable rules that are already on the client device 110 are sent in some cases. Sometimes, an entirely new rule may be sent and added to the device's telemetry rule set. Furthermore, the telemetry rules 121 may be transmitted to different client devices in different formats or multiple formats, depending on the particular implementation of the telemetry component 130 and the type of client device 110.

A client device 110 can be or can include computing systems or devices such as a laptop, desktop, tablet, reader, mobile phone, smartphone, wearable device, gaming console, smart television, an "Internet of Things" device, and a smart appliance (e.g., a refrigerator or smart home controller). Essentially any device with sufficient networking interfaces and processing capability to record telemetry data and send telemetry messages may be a client device. A given client device can be an instantiation of system 300 in FIG. 3.

Figure 2A:
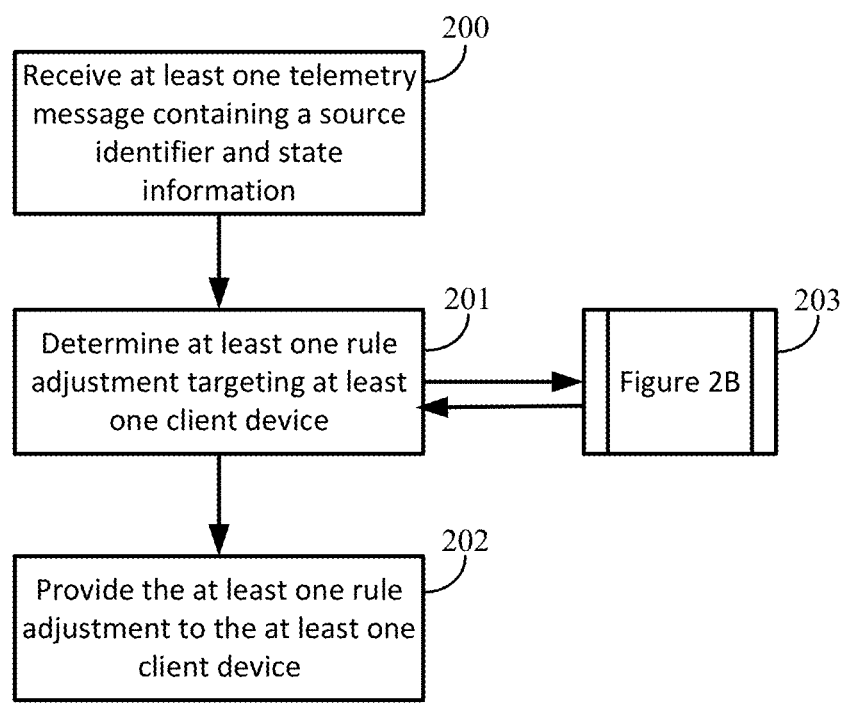
FIGS. 2A-2C show example process flows for dynamic telemetry message profiling and adjustment.
Figures 2B, 2C:
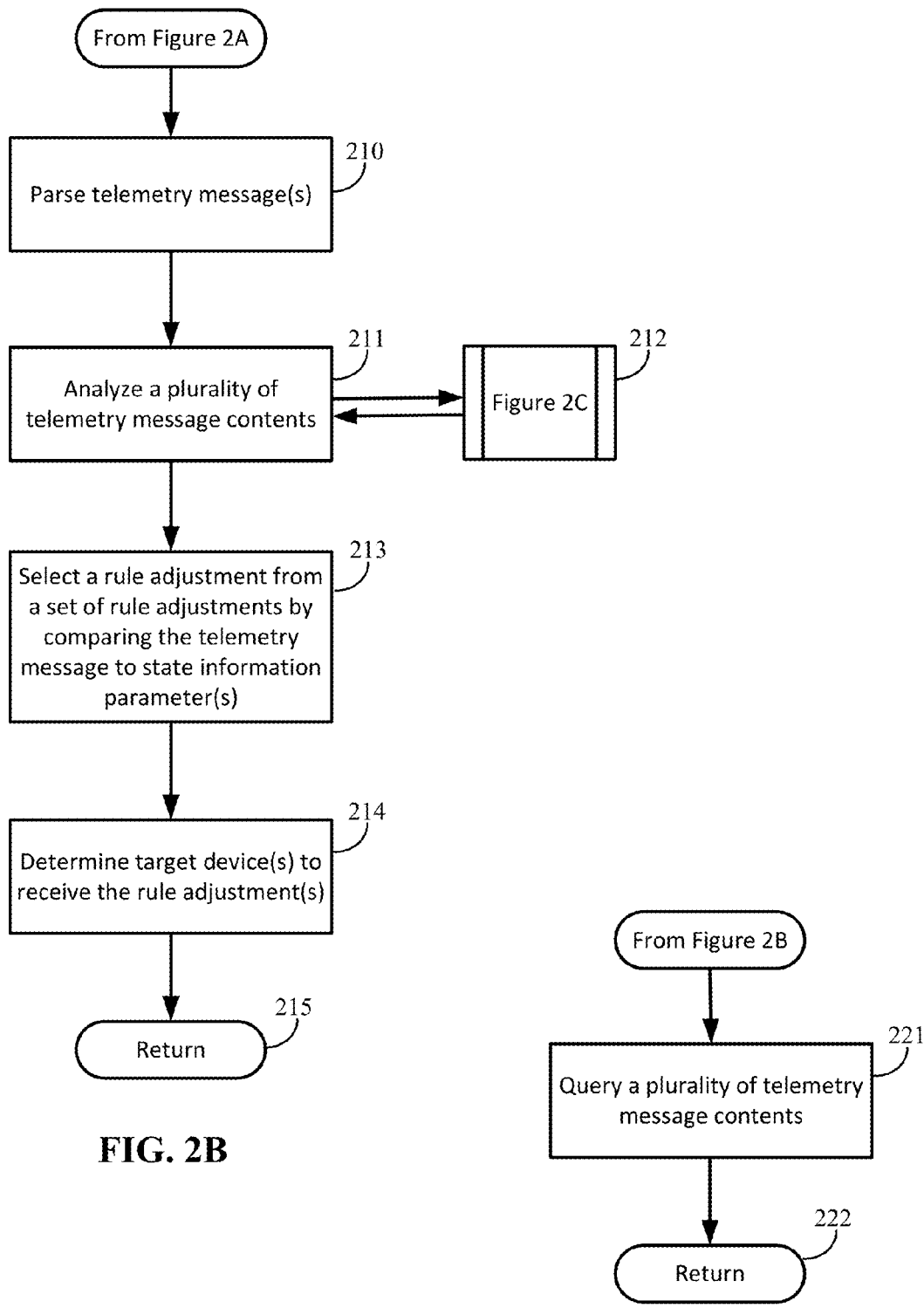

FIGS. 2A-2C show example process flows for dynamic telemetry message profiling and adjustment. The process flows in FIGS. 2A-2C may be implemented, for example, by telemetry service 100 as described in FIG. 1.

FIG. 2A shows a higher-level process flow that, in some implementations, includes sub-process flows as shown in FIGS. 2B and 2C. Beginning with FIG. 2A, telemetry service 100 may receive one or more telemetry messages containing a source identifier and state information (200). In response to receiving the one or more telemetry messages, the telemetry service determines at least one rule adjustment targeting at least one client device (201). The determined rule adjustment(s) are then provided to the target client devices (202). These processing steps will now be explored in greater detail.

Determining a rule adjustment can involve processing sub-stages, such as telemetry message parsing, and analysis, which can include further processing such as querying a data store containing stored telemetry messages. This type of processing may be appropriate for a sub-component such as the telemetry analyzer 122. Processing that may be included in the determination of at least one rule adjustment is a sub-processing (203) such as shown in FIG. 2B.

Turning to FIG. 2B, in some cases telemetry messages can arrive at the telemetry service 100 in an already-digestible format as a result of processes conducted on the client, perhaps by a telemetry component 130. However, in some implementations, telemetry messages may be parsed from their native message format upon arrival in order to make them more suitable for analysis (210). Parsing a telemetry message may include pattern matching or textual analysis on the message to discern contents such as relevant state information or source identifiers. The telemetry service 100 may sometimes store aspects of the contents separately in a data store (e.g., a relational database system) as data or metadata about the telemetry message, for such purposes as making the message easier to find, sort, analyze in real-time, and so that later analysis across multiple messages can be more easily performed.

Irrespective of whether telemetry messages have been parsed and stored in a manner different from the native format for a telemetry message in a given implementation, analysis of one or more telemetry messages (211) provides the capability to determine and enact at least one rule adjustment. Analysis of the telemetry messages results in automated decisions or determinations about rule adjustments that are then directed back at one or more client devices.

Analysis (211) can include other sub-processes, such as querying, as shown in FIG. 2C, to which processing is directed in some implementations by sub-process indicator 212 in FIG. 2B. Turning briefly to FIG. 2C, analysis can include querying the message contents (i.e., source identifier and state information) of one or more telemetry messages (221), which can then be used for pattern matching or decision-making. Queries may be available to find and sort stored telemetry messages as well as find and sort content within the source identifier or state information of the stored messages. In some implementations, querying can be performed across or upon multiple telemetry messages having selected criteria—such as, for example: messages having a certain source identifier; messages having one or more individual identifiers within a source identifier, messages with a particular error code, description, or other state information; and messages arriving over a particular time range.

A querying capability to enable telemetry message analysis may be implemented in a variety of ways. One implementation includes a query capability similar to structured query language (SQL). Some examples of SQL-like querying functions can include: selecting all or part of a telemetry message; performing arithmetic against all or part of a message (e.g., mathematical operations such as sum, count, average, percentiles, max, min); performing logical operations (e.g., greater than, equal to, less than, greater than or equal to, and less than or equal to) against all or part of a message; performing bit-wise operations (e.g., shift left, shift right) against all or part of a message; performing custom functions (e.g., user-defined functions that may include programming logic) against all or part of a message.

Querying functions that link or process multiple messages are also available in some implementations. Such querying functions can include the capability to create joins across messages based on similar or identical message contents, i.e., state information and/or source identifier (e.g., application, machine, user, component). Types of joins can include left join, right join, left outer join, right outer join, inner join, and full join. Some types of joins can use logical and arithmetic operands. It should be noted that these examples of querying functions are merely exemplary and are not intended to define an exclusive set of querying capabilities.

Querying functions described above are sometimes enabled using relational database management systems (RDBMS), an example of which is Microsoft SQL Server®. In some instances, a telemetry service may use an RDBMS to store telemetry messages and associated metadata. In some instances, a text search engine may be used to query telemetry message contents. The process flow returns to that shown in FIG. 2B from the query sub-process in FIG. 2C via return indicator 222.

In particular, after analyzing the telemetry message contents (211), one or more rule adjustments are then selected from the range of possible telemetry rules (213). Exploring the contents of one or more telemetry messages using querying functions can reveal facts, patterns, and relationships concerning telemetry data to the telemetry analyzer 122 that can assist in determining a rule adjustment. For example, discovery of an error code in a telemetry message can indicate that a rule adjustment associated with or indexed by the error code should be provided to the client device that sent the telemetry message. A query of other client devices for telemetry messages having the same error code, joined to other error conditions experienced by those other devices, may assist a telemetry service 100 in determining an appropriate set of rule adjustments by revealing additional related areas for telemetry collection.

One threshold aspect of the determination is whether more telemetry data should be collected from the device or from other devices. This determination may result, for example, in a rule adjustment to enable (or disable) telemetry logging on a particular device, application, or component.

Another aspect of the determination can involve which additional telemetry data to collect. This aspect includes such decisions as: the specific application or device area/category from which to collect more telemetry data; the specific application or device process from which to collect more telemetry data; the specific application or device thread from which to collect more telemetry data; the specific correlation identifier (e.g., an identifier indicating a group of devices based on arbitrary criteria, like a beta user group) from which to collect more telemetry data; the specific usage scenario from which to collect more telemetry data; and the specific system activity from which to collect more telemetry data.

Another aspect of the determination can involve which source identifiers (or individual identifiers within a composite source identifier) define the set of target clients, applications, or components at which the rule adjustment should be directed. This can include specific devices or populations of devices from which to collect different telemetry data. For example, the rule adjustments may target specific locations, languages, cultures, product versions, operating system versions, device form factors, etc.

Another aspect of the determination can involve when the telemetry data should be collected. This aspect can include such decisions as the specific date/time or time of day that certain telemetry data should be collected; and specific system events or triggers that might initiate a telemetry data adjustment (e.g., the simultaneous use of two applications may trigger additional telemetry in one of the applications during the time of simultaneous use). Timing/triggering parameters can be part of a rule adjustment with other rule parameters, or can be a timing/triggering modification to an existing telemetry collection process.

Another aspect of the determination can involve the expiration of the telemetry collection. This aspect can include such decisions as the specific date and time or time span for the telemetry collection to stop; and specific system events or triggers that might terminate a telemetry data adjustment.

It should be understood that none of the examples of aspects or decisions involved in a determination about rule adjustments are intended to limit the range of decisions involved in the determination to only those examples. It should also be noted that, in a given implementation, instance, or case, at least one aspect, only one aspect, all aspects, or any combination of aspects may be involved in a determination about rule adjustments.

Determining or selecting appropriate rule adjustments from the analysis (213) can be performed with various techniques. In some cases, rule adjustments and their targets may be determined by a sub-component of the telemetry service 100, for example the telemetry targeting engine 123 of FIG. 1.

In one implementation, particular kinds of telemetry state information can be mapped or indexed to one or more rule adjustments that should be enacted on a target client device. Such a mapping may be implemented as a one-to-many relationship between state information parameters (e.g., error code, component identifier, error description, hardware driver version, etc.) and rule adjustment instructions. Another implementation might use machine learning techniques to relate telemetry message patterns with rule adjustments using, for example, artificial neural networks, genetic algorithms, or similarity learning techniques. An implementation involving machine learning techniques might initially be trained by humans under supervised learning conditions.

Target device(s) to receive the rule adjustments are then determined (214). It should be noted that more client devices may be targeted than the client device sending the telemetry message; indeed, the client device sending the received telemetry message need not even be among those clients targeted for the rule adjustment. Target client devices may be determined by identifying client devices with the same or similar source identifier, or with one or more of the same or similar individual identifiers making up the source identifier. For example, a rule adjustment might target all the client devices using the Korean language version of a specific version of an application.

Returning now to FIG. 2A (via return step 215), the determined rule adjustment(s) are then provided to the target client devices (202). Providing the rule adjustment can occur by the telemetry service issuing a rule adjustment over a communication channel to the client device(s) ("push" notification), or by queueing a rule adjustment in an outbound message queue addressed to the client device(s), The outbound message may be delivered to the client device the next time the client device connects to the telemetry service 100 ("pull" notification). One or more message delivery services may facilitate the delivery of the rule adjustments.

Receipt of a telemetry message may not in all cases result in an immediate rule adjustment. Determining a rule adjustment and providing the rule adjustment may occur over a period of seconds, minutes, or longer depending on the nature of a telemetry message and the nature of the client device. In all cases the determination of a rule adjustment will be performed automatically by a processing component on a system as defined with respect to FIG. 3.

Another device type that may benefit from the disclosed techniques and systems includes Internet of Things (IoT) devices, including embedded devices and devices with low-power radios. An example of such a device is a network-connected gate lock. An embedded device of this nature also often is implemented on a low-cost computing platform with limited processing power, both because such devices are inexpensive and because low-power usage is environmentally sound.

Such a device might have various diagnostic capabilities, but only have the processing and network bandwidth to connect to a telemetry service once per day. One time per day, the device sends a single telemetry message with a source identifier and a status code as the state information. With respect to the gate lock, one day the status code indicates an error condition: the lock failed to close when requested. With the described systems and techniques, the telemetry service can receive the status code, and in response to a status code that indicates a diagnostic check is necessary (like the failure to close code), return a rule adjustment that requests that the lock run a diagnostic check of the level of grease in the lock's grease reservoir. The enhanced telemetry is returned to the service, which may result in a notification being sent by the telemetry service or a partner service to inform the gate owner or a technician.

Other kinds of telemetry data in addition to error state, such as usage data, also can benefit from techniques and systems for dynamic telemetry adjustment. Consider, for example, a scenario where a product designer wants to make a particular feature in an application (e.g., pivot tables in a spreadsheet application) easier to use. The feature requires multiple actions once activated.

A telemetry rule may be sent out to users of a certain version of the application to instruct a client device to register when a user uses the feature for the first time, and then send that information back to the telemetry service in a telemetry message. It should be understood that telemetry collection rules may follow privacy protocols and permissions (set by the service, user, or client device) to restrict or narrow access to private information. The telemetry service responds to the message by returning a rule adjustment to tell the device's telemetry components to track, in a detailed usage data log, the user's mouse movements in the application user interface for the next five times the user activates the particular feature. The usage data might contain information like mouse movements or menu/button clicks that could be analyzed later by a product designer to determine if a feature can be made easier to use. Here, only the first few times of feature usage by the user are collected since, once a user has become familiar with the feature, the user's movements may no longer be interesting to the product designer in making the feature more intuitive. The described systems and techniques allow improved collection of telemetry data with reduced network and processing impact on the device.

Figure 3:
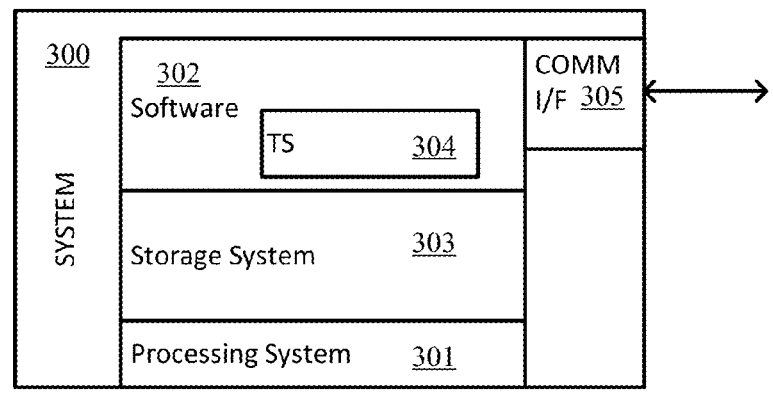
FIG. 3 shows a block diagram illustrating components of a computing device or system used in some implementations of the described telemetry service.

FIG. 3 shows a block diagram illustrating components of a computing device or system used in some implementations of the described telemetry service. For example, any computing device operative to run a telemetry service 100 or intermediate devices facilitating interaction between other devices in the environment may each be implemented as described with respect to system 300, which can itself include one or more computing devices. The system 300 can include one or more blade server devices, standalone server devices, personal computers, routers, hubs, switches, bridges, firewall devices, intrusion detection devices, mainframe computers, network-attached storage devices, and other types of computing devices. The hardware can be configured according to any suitable computer architectures such as a Symmetric Multi-Processing (SMP) architecture or a Non-Uniform Memory Access (NUMA) architecture.

The system 300 can include a processing system 301, which may include a processing device such as a central processing unit (CPU) or microprocessor and other circuitry that retrieves and executes software 302 from storage system 303. Processing system 301 may be implemented within a single processing device but may also be distributed across multiple processing devices or sub-systems that cooperate in executing program instructions.

Examples of processing system 301 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 303 may comprise any computer readable storage media readable by processing system 301 and capable of storing software 302 including telemetry service 100. Storage system 303 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations, storage system 303 may also include communication media over which software 302 may be communicated internally or externally.

Storage system 303 may be implemented as a single storage device but may also be implemented across multiple storage devices or sub-systems co-located or distributed relative to each other. Storage system 303 may include additional elements, such as a controller, capable of communicating with processing system 301.

Software 302 may be implemented in program instructions and among other functions may, when executed by system 300 in general or processing system 301 in particular, direct system 300 or processing system 301 to operate as described herein for enabling dynamic telemetry message profiling and adjustment. Software 302 may provide program instructions 304 that implement a telemetry service 100 or subcomponents thereof. Software 302 may implement on system 300 components, programs, agents, or layers that implement in machine-readable processing instructions the methods described herein as performed by telemetry service 100 (as instructions 304).

Software 302 may also include additional processes, programs, or components, such as operating system software, database management software, or other application software. Software 302 may also include firmware or some other form of machine-readable processing instructions executable by processing system 301.

In general, software 302 may, when loaded into processing system 301 and executed, transform system 300 overall from a general-purpose computing system into a special-purpose computing system customized to facilitate dynamic telemetry message profiling and adjustment. Indeed, encoding software 302 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage.

System 300 may represent any computing system on which software 302 may be staged and from where software 302 may be distributed, transported, downloaded, or otherwise provided to yet another computing system for deployment and execution, or yet additional distribution.

In embodiments where the system 300 includes multiple computing devices, one or more communications networks may be used to facilitate communication among the computing devices. For example, the one or more communications networks can include a local, wide area, or ad hoc network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 305 may be included, providing communication connections and devices that allow for communication between system 300 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of system 300 may be included in a system-on-a-chip (SoC) device. These elements may include, but are not limited to, the processing system 301, a communications interface 305, and even elements of the storage system 303 and software 302.

Figure 4:
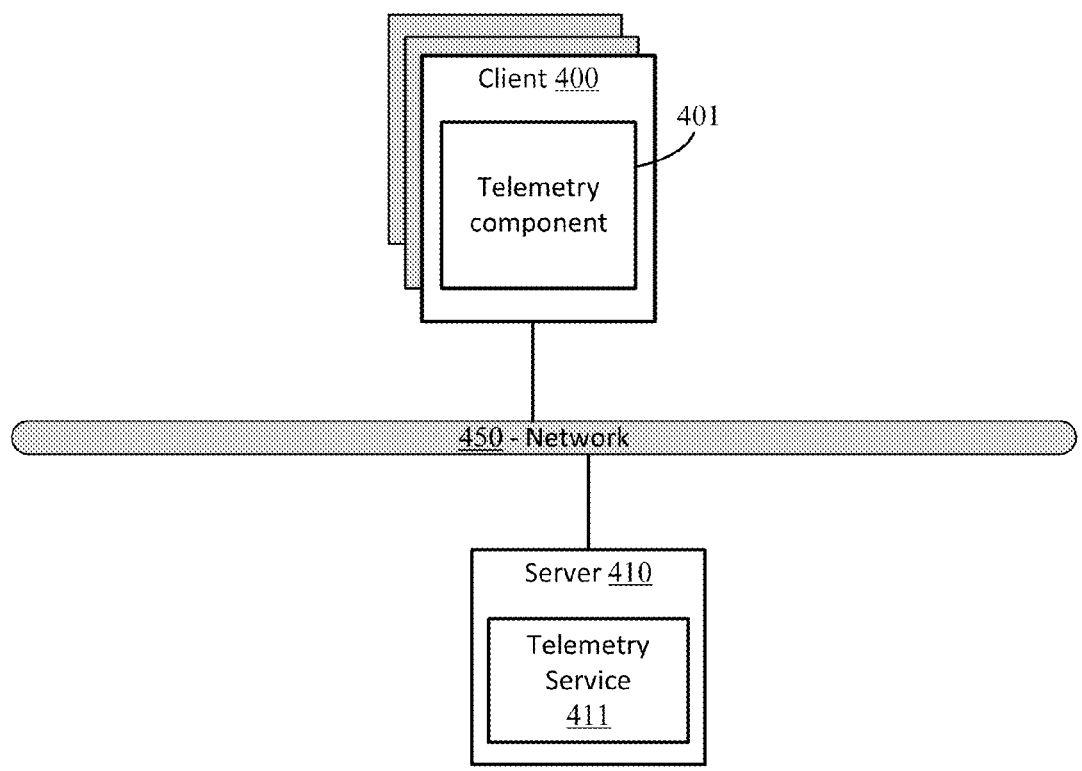
FIG. 4 illustrates an example system architecture in which an implementation of techniques for dynamic telemetry message profiling and adjustment may be carried out.

FIG. 4 illustrates an example system architecture in which an implementation of techniques for dynamic telemetry message profiling and adjustment may be carried out. In the example illustrated in FIG. 4, a telemetry component 401 for assembling and sending telemetry messages can be implemented on a client 400, which may be or include computing systems or devices such as a laptop, desktop, tablet, reader, mobile phone, wearable device, "Internet of things" device, and the like. Client 400 may be an instantiation of system 300. Multiple clients may be present in any operative environment, as indicated in FIG. 4 by the shadowed boxes behind client 400.

Telemetry service 411 may be implemented as software or hardware (or a combination thereof) on server 410, which may be an instantiation of system 300. Telemetry messages from client 400 may be directed to telemetry service 411 via an application programming interface, or via another messaging protocol.

Communications and interchanges of data between components in the environment may take place over network 450. The network 450 can include, but is not limited to, a cellular network (e.g., wireless phone), a point-to-point dial up connection, a satellite network, the Internet, a local area network (LAN), a wide area network (WAN), a Wi-Fi network, an ad hoc network, an intranet, an extranet, or a combination thereof. The network may include one or more connected networks (e.g., a multi-network environment) including public networks, such as the Internet, and/or private networks such as a secure enterprise private network.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain aspects of the invention provide the following non-limiting embodiments:

EXAMPLE 1

A system for enabling dynamic telemetry message profiling and adjustment, the system comprising: one or more computer readable storage media; a processing system; program instructions for a telemetry service stored on the one or more computer readable storage media that, when executed by the processing system, direct the processing system to, in response to receiving at least one telemetry message including a source identifier and state information: determine at least one rule adjustment targeting at least one client device; and provide the at least one rule adjustment to the at least one client device.

EXAMPLE 2

The system of example 1, wherein the program instructions to determine the at least one rule adjustment comprise instructions that direct the processing system to analyze a plurality of telemetry message contents stored on the one or more computer readable storage media.

EXAMPLE 3

The system of example 1 or 2, wherein the program instructions to determine the at least one rule adjustment comprise instructions that direct the processing system to select the at least one rule adjustment from a set of rule adjustments, wherein each member of the set of rule adjustments is mapped to one or more relevant state information parameters, wherein the set of rule adjustments is stored on the one or more computer readable storage media, by comparing the at least one telemetry message to the one or more relevant state information parameters.

EXAMPLE 4

The system of any of examples 1-3, wherein the state information includes one or more of an error descriptor, usage data, and performance data.

EXAMPLE 5

The system of any of examples 1-4, wherein the rule adjustment comprises a change in one or more of telemetry data collection verbosity, telemetry data collection frequency, telemetry data collection time, telemetry data collection duration, and telemetry data collection target.

EXAMPLE 6

The system of any of examples 1-5, wherein the at least one client device is identified by the source identifier.

EXAMPLE 7

The system of any of examples 1-6, wherein the source identifier includes a plurality of individual identifiers.

EXAMPLE 8

The system of example 7, wherein the at least one client device is identified by one or more of the plurality of individual identifiers.

EXAMPLE 9

A method of enabling dynamic telemetry message profiling and adjustment, the method comprising: receiving at least one telemetry message including a source identifier and state information; analyzing a plurality of telemetry message contents; selecting at least one rule adjustment from a set of rule adjustments, wherein each member of the set of rule adjustments is mapped to one or more relevant state information parameters, by comparing the at least one telemetry message to the one or more relevant state information parameters; determining at least one client device to receive the at least one rule adjustment; and providing the at least one rule adjustment to the at least one client device.

EXAMPLE 10

The method of example 9, wherein the state information includes one or more of an error descriptor, usage data, and performance data.

EXAMPLE 11

The method of example 9 or 10, wherein the rule adjustment comprises a change in one or more of telemetry data collection verbosity, telemetry data collection frequency, telemetry data collection time, telemetry data collection duration, and telemetry data collection target.

EXAMPLE 12

The method of any of examples 9-11, wherein the at least one client device is identified by the source identifier.

EXAMPLE 13

The method of any of examples 9-12, wherein the source identifier includes a plurality of individual identifiers, and wherein the at least one client device is identified by one or more of the plurality of individual identifiers.

EXAMPLE 14

A system for enabling dynamic telemetry message profiling and adjustment, the system comprising: a processing system; one or more computer readable storage media; a store, embodied on the one or more computer readable storage media, comprising a plurality of rule adjustments mapped to one or more stored telemetry message contents; and program instructions for a telemetry service stored on the one or more computer readable storage media that, when executed by the processing system, direct the processing system to, in response to receiving at least one telemetry message containing a source identifier and state information: compare the source identifier and state information to the one or more stored telemetry message contents to determine at least one particular rule adjustment from the plurality of rule adjustments; determine, from the source identifier and the state information and the at least one particular rule adjustment, at least one target client device; and provide the at least one particular rule adjustment to the at least one target client device.

EXAMPLE 15

The system of example 14, wherein the program instructions to compare the source identifier and state information to the one or more stored telemetry message contents comprise instructions that direct the processing system to query the one or more stored telemetry message contents.

EXAMPLE 16

The system of example 15, wherein the program instructions to query the one or more stored telemetry message contents comprise instructions that direct the processing system to select at least a part of a particular one or more of the one or more stored telemetry message contents.

EXAMPLE 17

The system of example 15 or 16, wherein the program instructions to query the one or more stored telemetry message contents comprise instructions that direct the processing system to perform one or more of arithmetic functions, logical operations, and bitwise operations on at least a part of a particular one or more of the one or more stored telemetry message contents.

EXAMPLE 18

The system of any of examples 15-17, wherein the program instructions to query the one or more stored telemetry message contents comprise instructions that direct the processing system to perform a custom function on at least a part of a particular one or more of the one or more stored telemetry message contents.

EXAMPLE 19

The system of any of examples 15-18, wherein the program instructions to query the one or more stored telemetry message contents comprise instructions that direct the processing system to perform a join on a particular two or more of the one or more stored telemetry message contents.

EXAMPLE 20

The system of any of examples 15-19, wherein the program instructions to query the one or more stored telemetry message contents comprise instructions that direct the processing system to perform a join between the source identifier of the at least one telemetry message and the one or more stored telemetry message contents.

EXAMPLE 21

A system for enabling dynamic telemetry message profiling and adjustment, the system comprising: a means for receiving at least one telemetry message including a source identifier and state information; a means for analyzing a plurality of telemetry message contents; a means for selecting at least one rule adjustment from a set of rule adjustments, wherein each member of the set of rule adjustments is mapped to one or more relevant state information parameters; a means for determining at least one client device to receive the at least one rule adjustment; and a means for providing the at least one rule adjustment to the at least one client device.

EXAMPLE 22

The system of example 21, wherein the means for selecting the at least one rule adjustment comprises a means for comparing the at least one telemetry message to the one or more relevant state information parameters.

EXAMPLE 23

The system of example 21 or 22, wherein the state information includes one or more of an error descriptor, usage data, and performance data.

EXAMPLE 24

The system of any of examples 21-23, wherein the rule adjustment comprises a change in one or more of telemetry data collection verbosity, telemetry data collection frequency, telemetry data collection time, telemetry data collection duration, and telemetry data collection target.

EXAMPLE 25

The system of any of examples 21-24, wherein the at least one client device is identified by the source identifier.

EXAMPLE 26

The system of any of examples 21-25, wherein the source identifier includes a plurality of individual identifiers, and wherein the at least one client device is identified by one or more of the plurality of individual identifiers.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for enabling dynamic telemetry message profiling and adjustment, the system comprising:
one or more computer readable storage media;
a processing system comprising a central processing unit (CPU), a microprocessor, circuitry, or a combination thereof;
program instructions for a telemetry service stored on the one or more computer readable storage media that, when executed by the processing system, direct the processing system to, in response to receiving at least one telemetry message including a source identifier and state information:
determine at least one rule adjustment targeting at least one client device, wherein the program instructions to determine the at least one rule adjustment comprise instructions that direct the processing system to select the at least one rule adjustment from a set of rule adjustments, wherein each member of the set of rule adjustments is mapped to one or more relevant state information parameters, wherein the set of rule adjustments is stored on the one or more computer readable storage media, by comparing the at least one telemetry message to the one or more relevant state information parameters; and
provide the at least one rule adjustment to the at least one client device.

2. The system of claim 1, wherein the program instructions to determine the at least one rule adjustment comprise instructions that direct the processing system to analyze a plurality of telemetry message contents stored on the one or more computer readable storage media.

3. The system of claim 1, wherein the state information includes one or more of an error descriptor, usage data, and performance data.

4. The system of claim 1, wherein the rule adjustment comprises a change in one or more of telemetry data collection verbosity, telemetry data collection frequency, telemetry data collection time, telemetry data collection duration, and telemetry data collection target.

5. The system of claim 1, wherein the at least one client device is identified by the source identifier.

6. The system of claim 1, wherein the source identifier includes a plurality of individual identifiers.

7. The system of claim 6, wherein the at least one client device is identified by one or more of the plurality of individual identifiers.

8. A method of enabling dynamic telemetry message profiling and adjustment, the method comprising:
receiving at least one telemetry message including a source identifier and state information;
analyzing a plurality of telemetry message contents;
selecting at least one rule adjustment from a set of rule adjustments, wherein each member of the set of rule adjustments is mapped to one or more relevant state information parameters, by comparing the at least one telemetry message to the one or more relevant state information parameters;
determining at least one client device to receive the at least one rule adjustment; and
providing the at least one rule adjustment to the at least one client device.

9. The method of claim 8, wherein the state information includes one or more of an error descriptor, usage data, and performance data.

10. The method of claim 8, wherein the rule adjustment comprises a change in one or more of telemetry data collection verbosity, telemetry data collection frequency, telemetry data collection time, telemetry data collection duration, and telemetry data collection target.

11. The method of claim 8, wherein the at least one client device is identified by the source identifier.

12. The method of claim 8, wherein the source identifier includes a plurality of individual identifiers, and wherein the at least one client device is identified by one or more of the plurality of individual identifiers.

13. A system for enabling dynamic telemetry message profiling and adjustment, the system comprising:
- a processing system comprising a central processing unit (CPU), a microprocessor, circuitry, or a combination thereof;
- one or more computer readable storage media;
- a store, embodied on the one or more computer readable storage media, comprising a plurality of rule adjustments mapped to one or more stored telemetry message contents; and
- program instructions for a telemetry service stored on the one or more computer readable storage media that, when executed by the processing system, direct the processing system to, in response to receiving at least one telemetry message containing a source identifier and state information:
  - compare the source identifier and state information to the one or more stored telemetry message contents to determine at least one particular rule adjustment from the plurality of rule adjustments;
  - determine, from the source identifier and the state information and the at least one particular rule adjustment, at least one target client device; and
  - provide the at least one particular rule adjustment to the at least one target client device.

14. The system of claim 13, wherein the program instructions to compare the source identifier and state information to the one or more stored telemetry message contents comprise instructions that direct the processing system to query the one or more stored telemetry message contents.

15. The system of claim 14, wherein the program instructions to query the one or more stored telemetry message contents comprise instructions that direct the processing system to select at least a part of a particular one or more of the one or more stored telemetry message contents.

16. The system of claim 14, wherein the program instructions to query the one or more stored telemetry message contents comprise instructions that direct the processing system to perform one or more of arithmetic functions, logical operations, and bitwise operations on at least a part of a particular one or more of the one or more stored telemetry message contents.

17. The system of claim 14, wherein the program instructions to query the one or more stored telemetry message contents comprise instructions that direct the processing system to perform a custom function on at least a part of a particular one or more of the one or more stored telemetry message contents.

18. The system of claim 14, wherein the program instructions to query the one or more stored telemetry message contents comprise instructions that direct the processing system to perform a join on a particular two or more of the one or more stored telemetry message contents.

19. The system of claim 14, wherein the program instructions to query the one or more stored telemetry message contents comprise instructions that direct the processing system to perform a join between the source identifier of the at least one telemetry message and the one or more stored telemetry message contents.

* * * * *